Patented July 22, 1947

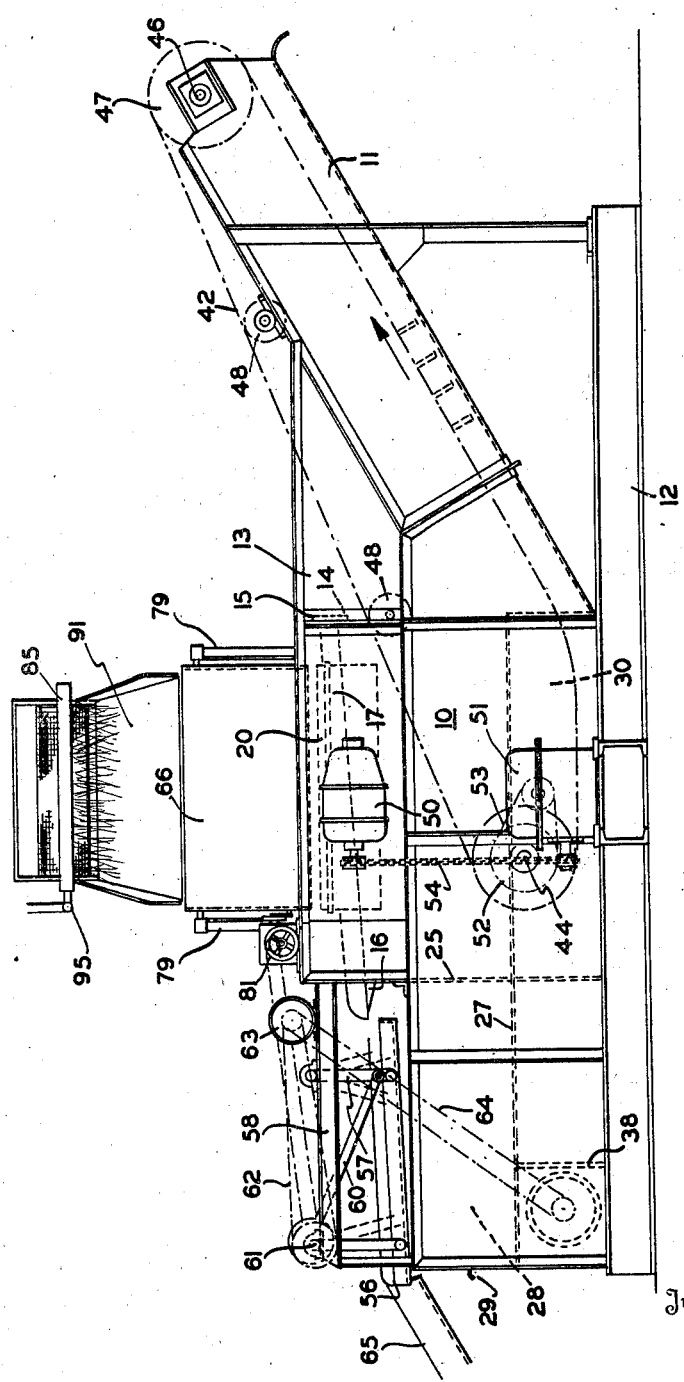

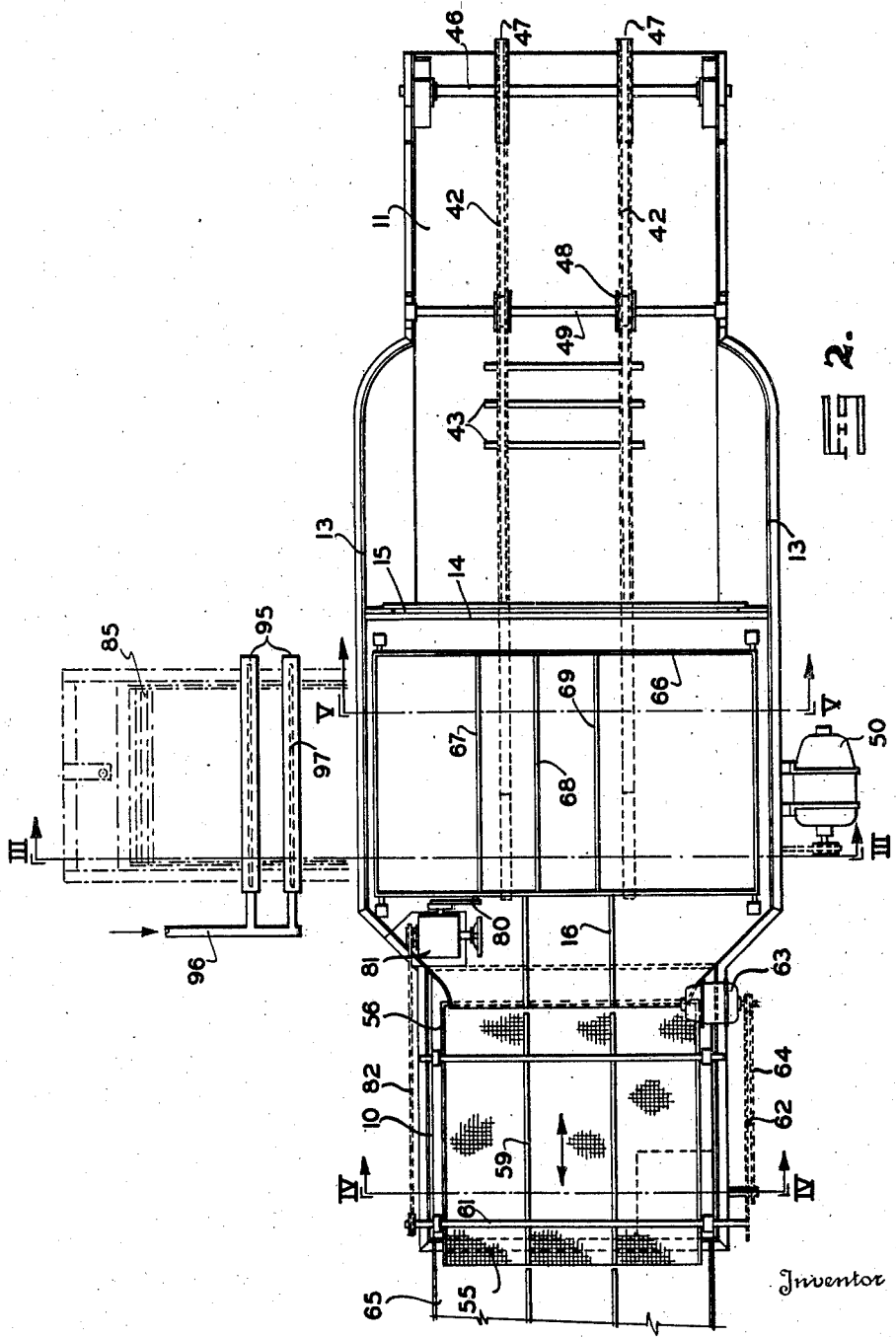

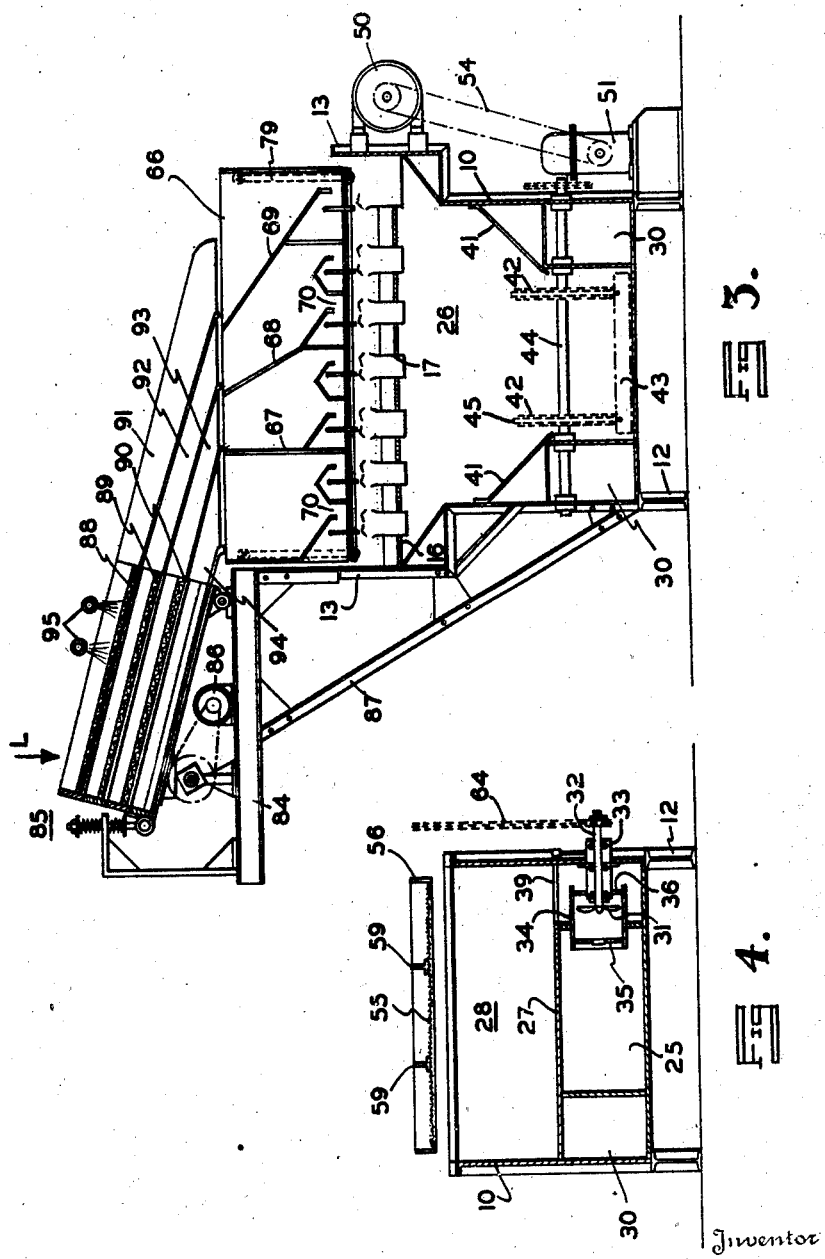

2,424,517

UNITED STATES PATENT OFFICE 2,424,517

UPWARD CURRENT HYDRAULIC APPARATUS FOR SEPARATING MATERIALS OF DIFFERENT SPECIFIC GRAVITIES

Willard W. Stranahan, Camp Hill, Pa., assignor to L. B. Smith, Incorporated, Camp Hill, Pa., a corporation of Pennsylvania Application October 28, 1943, Serial No. 508,043

7 Claims. (Cl. 209—158)

This invention relates to equipment for the recovery of coal, coke and other useful products from waste material normally discarded in mining and coking operations and from other agglomerated materials.

In the production of coke from coal, particularly for metallurgical uses, by the early common "bee-hive" methods a considerable proportion of the waste materials resulting from such operations is found to be sintered carbonaceous material of good burning and heating qualities if properly treated and separated from the bulk of the waste materials. It is found that such carbonaceous material is generally similar in physical structure and compares favorably in quality with coke screenings now generally supplied for consumption in domestic heating plants. This useful material has, in large amounts, lain dormant for many years in the refuse dumps resulting from prior "bee-hive" coking operations and it is one of the principal objects of the present invention to provide equipment which is operative to economically recover this useful material and properly prepare the same for various advantageous uses, principally consumption in a domestic heating plant.

Generally, the problems posed in the recovery and preparation of the coke is the elimination from the agglomerated refuse materials of particles and objects having a higher specific gravity than that of the coke such as, for example, brickbats and shale, lighter ash materials, and such pulverulent materials as coke breeze, fly ash and soil whereby the resultant product is clean and of uniform quality rendering it comparable in quality with coke screenings now being produced. It is a further object of the present invention to provide a material separation and preparation apparatus which overcomes all the above problems in an expeditions and economical manner.

The apparatus of the invention while of sufficient productive capactiy and ruggedness for practical commercial operations is yet sensitive enough in its discriminatory phases to effect the desired and required completeness of separation. Further, the construction and operation of the apparatus is such that provision for the complete elimination of the undesirable pulverulent materials is inherent in the same. Also the apparatus, particularly as regards its specific gravity classifying aspects, is capable of ready but minute adjustment whereby the same equipment may with facility be employed to separate either the heavier or the lighter materials from the final product.

The invention disclosed herein is also of particular applicability in the recovery and preparation of coal from slack dumps commonly termed "column banks" resulting from prior and current pit mining operations and from waste materials known to the trade as "rooster coal" resulting from current strip mining operations. Both these waste materials contain a large proportion of stone, shale, etc., and it is a further object of this invention to provide improved and practical methods and apparatus whereby these materials may be economically processed in a continuous manner and in large volumes to recover therefrom coal of good uniform quality and in cleaned washed condition.

A more specific object of the invention is the provision, in a material separating plant of the hydraulic current type, of improved arrangements for varying and controlling the velocity of the hydraulic currents. In accordance with the present invention the hydraulic currents are effected in open topped vertical flumes which are individually adjustable as to elevation so that the velocity of fluid flow in the respective flumes may be individually controlled. This is of particular advantage when the apparatus is employed in connection with a size classifier as experience has shown that the velocity of the hydraulic current should be correlated with respect to the unit volumes of the material being treated as well as with respect to the specific gravities thereof. Further, additional means is provided to minutely adjust the hydraulic head existent at the bottom ends of the various flumes whereby the velocity of the current in all the flumes may be simultaneously varied.

Another specific object of the invention is the provision, in a classifier of the hydraulic current type, of improved arrangements for introducing the material being separated into the currents and for regulating the flow of material into the currents. According to the present invention the hydraulic currents are contained in vertically extending columns or flumes and the construction of the upper ends of these flumes is such that the hydraulic column is, at the discharge, divided into equal parts on either side of the flumes. By depositing the material centrally of the column interference between the downwardly moving materials being charged and the lighter materials being floated out with the discharge stream is very materially minimized thereby effecting a sharp division of the materials. I have also found that accuracy in the separating process may be maintained while large total volumes of material is passed through the apparatus if the flow of materials into the columns is accurately metered in relation to the nature of the materials being processed and the velocity being employed in the columns. For this purpose I position a novel feeding or charging apparatus above the fluid columns which is operative to intermittently charge the columns, the time interval between the depositions of the material being wholly sufficient to allow the columns to become fairly well cleared.

A further specific object of the invention is the provision of a classifying plant of the hydraulic current type which possesses wide flexibility as to uses, which is capable of processing large amounts of material in a continuous manner, but which nevertheless is simple in design, economical to construct, and capable of being transported on conventional facilities with little dismantling. These objects are accomplished, principally, by providing an elongated tank and supporting structure which contains and mounts most of the elements of the complete assembly. These elements are so arranged that material to be processed is fed to the apparatus from above and substantially centrally thereof after which it is divided with the heads being discharged at one end of the elongated apparatus while the tailings are discharged at the other end thereof. In this manner a unitary, simplified and compact plant is provided, particularly since the required material moving means is built into the plant as an integral part thereof.

Other specific objects of the invention is the provision, in a classifying plant of the hydraulic current type, of an improved hydraulic fluid circuit whereby the power required to maintain the currents is lessened and the mechanical construction of the various fluid tanks and passages required is simplified.

The above and other objects and advantages of the invention will become apparent upon consideration of the following detailed specification and the accompanying drawing wherein there is specifically disclosed a preferred embodiment of the invention.

In the drawing:

Figure 1 is a side elevation of a plant constructed in accordance with the principles of the invention;

Figure 2 is a plan view of the apparatus of Figure 1;

Figure 3 is a transverse section along the line III—III of Figure 2;

Figure 4 is a fragmentary section along the line IV—IV of Figure 2; and

Figure 5:
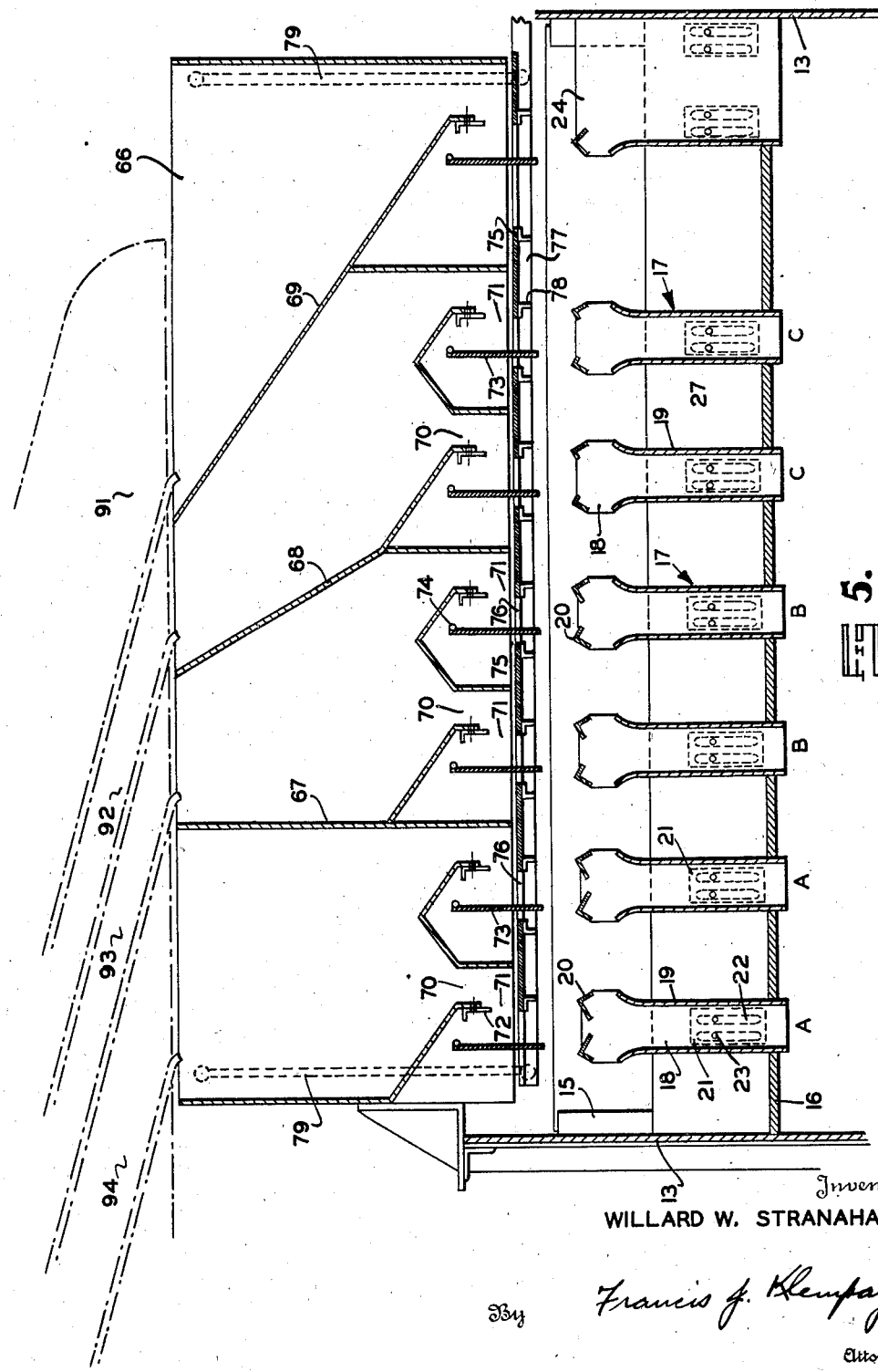
Figure 5 is a transverse section, on an enlarged scale, the section being taken on line V—V of Figure 2.

The apparatus of the invention, in its preferred and illustrated embodiment, comprises an elongated tank 10 of open topped construction and having an outwardly and upwardly extending portion 11. Tank 10 and extension 11 are conveniently supported on skids 12 which are of heavy I-beam construction thereby lending rigidity to the assembled apparatus. Tank 10 is provided at its end adjacent the extension 11 with vertically extending side walls 13 which are stepped outwardly from the principal side walls of the tank as indicated in Figures 2 and 3. It will be observed that the walls 13 extend over to and connect with the extension 11. Spanning the walls 13 substantialy at their center portions is a vertically disposed wall 14 having a vertically adjustable weir 15 mounted thereon. Also spanning the walls 13 and extending rearwardly from the wall 14 is a sloping deck 16 through which extend a plurality of transversely aligned but vertically disposed and vertically adjustable flumes 17 now to be described.

Referring now to Figures 1, 3 and 5, each of the flumes 17 consists of a box-like structure having end walls 18 and side walls 19 which flare outwardly at their upper ends. As shown, the end walls 18 are widened at their top ends to match the outward flaring of the upper ends of the side wall 17 and extend a considerable distance above the top edges of the side walls 19. Spanning the upper ends of the end walls 18 of each of the flumes 17 is a pair of inverted angle members 20 the upper surfaces of which form a trough or funnel for diverting materials placed thereon to the center of the flumes 17. The apparatus illustrated is arranged to receive materials divided into three size classifications and to effectively handle such different sized materials the opening between the angles 20 is varied in the respective flumes. Thus, the opening between the angles 20 of the two flumes marked A which are arranged to receive the smaller sized material is smaller than the openings between the angles 20 of the two flumes B which receive the medium sized materials. Flumes C receive the coarser materials.

In mounting the flumes 17 on the deck 16 appropriate elongated apertures are formed in the deck to slidably receive the respective flumes. An angle 21 having its base leg rigidly secured to the deck 16 is positioned adjacent each end of the apertures above mentioned. The vertical legs of the angles 21 overlie portions of the end walls 18 of the flumes and are each provided with vertically extending slots 22 through which extends bolts 23 which are operative to clamp the end walls to the angles 21 in vertically adjusted positions. In this manner the vertical position of each of the flumes 17 with respect to the deck 16 may be varied and maintained. Also extending upwardly from the deck 16 at the end of the line of flumes A, B and C is a large fixed flume 24 arranged to receive the over-sized materials coming from the classifying apparatus which feeds the materials to the flumes A, B and C.

Spanning the walls 13 and the principal side walls of the tank 10 is a wall 25 which depends from beneath the deck 16 to provide below said deck a pressure chamber 26, the operation and function of which will be explained in detail below. Extending horizontally and rearwardly from the wall 25 and spaced above the bottom of the tank 10 is a floor 27 which, with a portion of the wall 25, portions of the side walls of the tank 10 and the upper portion of the rear end wall of the tank 10 forms an open topped tank 28 having an overflow 29.

Connecting with openings in the lower corners of wall 25 and extending longitudinally forward along either of the sides of the tank 10 are the ducts 30 which discharge into the lower end of the extension 11 as indicated in Figure 1. To provide means to circulate the hydraulic fluid utilized in the apparatus from the return tank 28 through the ducts 30 and thus to the pressure chamber 26 I provide a propeller 31 which is carried by a shaft 32 which is journaled in a closed tube 33 which in turn extends through and is carried by the side wall of the tank 10. Surrounding the propeller 31 is a tube 34 having open spiders 35 and 36 at either end thereof. Surrounding tube 34 is a baffle 37 which in conjunction with a vertical wall 38 positioned beside the tube forms the inlet chamber for the fluid pump above described. An opening 39 in the floor 27 provides communication between the return tank 28 and the inlet to the pump and, of course, the outlet of the pump is in direct communication with the inlet ends of the ducts 30 as will be understood.

From the above description it will be apparent that the hydraulic fluid utilized in the apparatus is pumped from the return tank 28 through the ducts 30 and into the space 26 beyond the wall 25. Space 26 is thus completely filled with water under pressure determined by the heighth of the adjustable weir 15, the position of the weir determining the maximum head of the fluid in the apparatus beyond the wall 25 since any excess fluid coming into this space spills over the weir 15 and flows down the deck 16 into the top of the return tank 28. Inasmuch as the fluid below deck 16 is under positive pressure upwardly directed fluid currents will be effected in the flumes 17 and the velocities of such currents will be determined, of course, by the pressure existant below the deck 16 as adjusted by the weir 15 and by the vertical position of the respective flumes 17 in relation to the deck 16. In this manner the fluid currents may be readily adjusted as to velocity either simultaneously or individually thus contributing materially to the efficacy of operation of the assembled apparatus.

In operation, the material to be separated is deposited between the angles 20 of the respective flumes 17 from where it falls into the centers of the upwardly directed fluid currents contained in said flumes. The heavier material continues its descent downwardly through the flumes 18 and is deposited in the space 26 while the material of lower specific gravity is buoyed upwardly by the currents and ejected therefrom with the flow of fluid between the lower outer edges of the angles 20 and the upper edges of the adjacent side walls 19 and is thus deposited on the sloping deck 16. The lighter material deposited on the deck 16 is washed downwardly along the deck by the torrents of fluid issuing from the flumes and also by the flow of fluid which may be spilling over the weir 15. In this manner the material is effectively removed from the separating flumes as fast as it is separated thus enabling the apparatus to operate at a higher rate of production. The heavier material falling down through the fluid contained in chamber 26 is deposited on the floor of the chamber between the ducts 30, suitable directing baffles 41 being employed to direct the material to the bottom center of the space 26. A suitable conveyor consisting of a pair of endless drag chains 42 to which is secured a multiplicity of drag blocks 43 is employed to remove the heavier material from between the ducts 30 and up the extension 11 for discharging from the apparatus. To support and drive the chains 42 a shaft 44 extends transversely through the tank 10 and keyed to this shaft is a pair of spaced sprockets 45. A second shaft 46 carrying spaced sprockets 47 is journalled in the upper end of the tank extension 11 and the chains 42 are entrained over sprockets 45 and 47 as shown. Chains 42 have sufficient slack to allow the bottom reaches thereof to sag sufficiently to allow the drag blocks 43 to scrape along the bottom of the tank 10 and along the bottom of the inclined portion 11. The upper reaches of the chains 42 are supported on idler pulleys 48 carried by transverse shafts 49. Shaft 44 is arranged to be driven by a motor 50 adjustably mounted, for vertical movement, on the outer face of one of the walls 14 through a speed reducing mechanism 51, the output shaft of which is connected with the sprocket 52, keyed to shaft 44, by means of a chain 53. A belt 54, preferably of the multiple V type connects motor 50 with the input shaft of reducer 51. Upon energization of motor 50 chains 42 are moved thus causing the drag blocks 43 carried thereby to discharge the heavier material from the apparatus.

The lighter materials which are flushed off the deck 16 in the manner above described are deposited onto a dewatering screen 55 which is carried by a suitable frame 56 which is, in turn, rockably supported by four rocker arms 57, the upper ends of which are pivotally mounted on frame members 58 spaced above the top of the tank 28. As shown in Figures 2 and 4 screen 55 is divided into three channels by the two dividing plates 59 thereby providing means to maintain the size classification of the lighter materials passing through the apparatus. The dewatering screen 55—56 is arranged to be reciprocated by a pair of arms 60 which are eccentrically connected with a shaft 61 journaled on the frame members 58. The shaft 61 is arranged to be driven by a belt 62 from a motor 63 and this same motor is also utilized, in the illustrated embodiment of the apparatus, to drive the shaft 32 of the pump 31 through the belt 64. Screen 55, 56 is tilted as shown in Figure 1 and by reason of this inclination as well as the reciprocation of the screen by the motor 63 the materials washed onto the screen will be caused to traverse the screen and be discharged at the chutes 65. In traversing the screen the agitation imparted to the material effectively removes the water or other fluid employed in the separation process. This water or fluid drops downwardly and is collected in the tank 28.

The present invention provides means to meter the flow of the materials to be separated through the separating fluid currents and this feature has been found to be highly advantageous in practice since it provides for the regulating of a maximum volume of flow of materials through the apparatus without incurring any interference with the hydraulic separation process by reason of the overloading or clogging of the flumes carrying such currents. To effect this improved regulated mode of operation I provide a novel feeding arrangement comprising a compartmented bin 66 which extends across the top of the apparatus above the flumes 17. As shown, transversely extending walls 67, 68 and 69 divide the bin 66 into four compartments and each of these four compartments is provided with two hoppers in its bottom wall, each being provided with an outlet 70. Referring to Figure 5, it will be observed that there is an opening 71 in one wall of each of the vertical ducts extending downwardly from the opening 70 and the size (height) of these openings 71 may be adjusted by varying the vertical position of the gates 72. In the spaces beyond the opening 71 there is suspended the flaps 73 which are arranged to have free swinging movement about their pivots 74. The floor or bottom wall of the bin 66 consists of a plate 75 having a plurality of transversely extending openings or slots 76 therein through which extend the flaps 73. Plate 75 is mounted on a stiffening frame consisting of side rails 77 and transverse angles 78 adjacent the openings.

76 and this frame is supported for reciprocating movement relative to the bin 66 by the links 79 which are pivotally connected at their upper ends to the side walls of the bin 66 and at their lower ends to the frame 77, 78. Now referring to Figure 5 it will be apparent that as the plate 75 is moved to the right to position the openings 76 closer under the hopper opening 70 a certain amount of material will gravitate down through opening 70, through openings 71 and 76, and onto the funnel-like troughs formed by the angles 20 of the flumes 17. Now as the plate 75 is moved to the left the material ceases to flow due to its inability to travel horizontally along the plate 75 and to the presence of the flaps 73 against which the right edges of the opening 76 move. When the plate 75 has reached the end of its stroke to the left the flaps 73 practically seal off the opening 76 on the sides adjacent the opening 71 so that regardless of the character of the material being fed the flow of material is interrupted each cycle of operation. This method of feeding provides a time interval during which the currents in the flumes 17 are cleared or substantially cleared of material previously deposited thereby preventing newly charged material from bucking down material previously deposited and being buoyed up by the currents. This time interval may, of course, be adjusted to effect maximum output of the apparatus while maintaining a high degree of efficiency in a separation process by varying the period of the reciprocating plate 75. As shown in Figure 2 plate 75 may be reciprocated by an arm 80 eccentrically connected to the output shaft of a variable speed reducer 81 the input shaft of which may be driven from shaft 61 through a belt 82. Further adjustment of the rate of feed of the material to the hydraulic currents may, of course, be made by varying the positions of the gates 72. This provides a volume adjustment while the reciprocating drive provides essentially a period adjustment.

Supported on a frame 84 extending outwardly from the upper portion of the bin 66 is a shaker screen 85 arranged to be oscillated by a motor 86. The frame 84, together with its supporting braces 87 are preferably readily detachable from the main assembly of the apparatus to enable the main assembly to be transported on a conventional highway trailer or on a conventional railroad car. Screen 85 is of the multiple type, having webs 88, 89 and 90 of progressively smaller mesh as is conventional in such structures. The material to be separated is deposited on the shaker screen 85 at approximately the location L and the coarser material which does not pass through screen 88 passes down a chute 91 into the end compartment of the bin 66 which is above the flume 24. The material which passes through the coarse screen 88 but not through the medium screen 89 passes down a chute 92 into the feed compartment above the flumes C. Other chutes 93 and 94 convey the further grated material into the compartments above the flumes A and B.

As stated above one of the requirements in the processes to which the apparatus described herein is particularly adaptable is the removal of breeze and other pulverulent constituents of the material being processed. In accordance with the methods of the present invention the greater part of these fines are eliminated before the material is passed into the principal separating equipment so as to obviate the possibility of excessive sludge interfering with the proper operation of the separating plant. This arrangement also enables a much better control over the viscosity and specific gravity of the hydraulic separating fluid employed to be maintained. To effect this arrangement I provide one or more spray heads 95 extending across the screen 85 below the loading point L and these heads may each comprise a length of pipe closed off at one end and connected at its other end with a conduit 96 leading from a source of water under pressure. Pipe 95 is provided with a longitudinally extending slit 97 directed toward the material on the screen so as to direct a sheet of water through the material moving down the screen 85.

In operation, with the apparatus filled with the desired hydraulic fluid, normally water, the motors 50, 63 and 86 are energized to effect the required circulation of the fluid and the actuation of the feeding mechanism 66—78, the screens 55 and 85 and the discharge conveyors 42—47. As the material comes from the screen 85 it is accumulated in the compartment of the bin 66 from where it is discharged into the fluid currents contained in the flues 17 and 24 in the manner above described. The currents separate the material according to the specific gravity of its components, the heavier materials being discharged from the apparatus by the drag 42—43 while the lighter materials are discharged down the chute 65. Depending on the particular process or particular part of a process being carried out by the apparatus either the heavier component or the lighter component is discarded while the remaining component may be taken as a finished product or as raw material for subsequent treating operations. In the recovery of coal from column banks, for example, the agglomerated material of the bank may be first passed through the apparatus set up and adjusted in such manner that shale, rock and other heavier debris is discharged by the drag 42—43 and subsequently discarded or utilized for other purposes such as road aggregate, etc. The heads resulting from this operation may then, in the same or in another piece of equipment, be further separated to remove ash, coke and other lighter materials, the apparatus employed being set up and adjusted to effect the necessary discrimination at the proper specific gravity value, and in this case the desired product is then discharged by the conveyor 42—43. The apparatus is similarly adaptable in other specific processes some of which are mentioned above.

It should now be apparent that I have provided apparatus which accomplishes the objects initially set out. The invention provides a practical plant whereby vast quantities of entirely usable coke may be recovered from coking operations' refuse banks which have lain dormant for many years, whereby entirely usable coal may be economically recovered from column banks and rooster coal masses above described heretofore considered entirely as waste, and whereby material washing and hydraulic separation generally may be more economically effected.

The apparatus of the invention is of such organization that the same is rugged and compact and wholly practical in operation while yet being simple in design and economical to construct and erect in the field. Aside from the shaker screen 85, its support 84, and possibly the feed bin 66, the entire plant may be constructed and assembled in a factory and transported bodily, as a completed unit, to the scene of operations on readily available facilities as explained above. The herein described controls of the feeding of the agglomerated materials to the separating currents effects such continuity of operations that the productive capacity of the plant is substantial. The fluid circulatory system is such that the power required to maintain the same in continuous operation is quite low while the provision of means to simultaneously adjust the velocity of all the separated currents as well as of means to adjust the currents individually is advantageous as pointed out above.

It will be understood, of course, that suitable clean-out doors, not shown, may be provided in the side walls of the various tanks where desired. Further, it is contemplated that particularly in the treating of coal the hydraulic fluid coming into the tank 28 may be caused to flow through a settling tank, not shown, for recovering the breeze which in itself is of some value. In the use of the apparatus the material to be processed will normally be crushed before being deposited on the screen 85.

While the invention involved herein is concerned primarily with the processing of the waste materials lying in refuse dumps resulting from coking operations and in column banks and the like and while the apparatus disclosed is especially suited to such use it should be understood, of course, that the apparatus of the invention is equally applicable for use in the washing or processing of newly mined coal, either bituminous or anthracite.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In hydraulic classifying apparatus having an upwardly directed flume to retain an upwardly flowing current of hydraulic fluid the combination of a material hopper positioned above the open upper end of said flume, an opening in the lower end of said hopper, a gate for said opening, and means to open and close said gate in timed sequence whereby said current is supplied with predetermined batches of the agglomerated materials contained in said hopper at predetermined recurrent intervals of time.

2. Apparatus according to claim 1 further including means to vary the effective area of said opening in said hopper whereby the total quantity of materials contained in said batches may be varied.

3. Apparatus according to claim 1 further including means to vary the length of said recurrent time intervals.

4. Hydraulic classifying apparatus comprising in combination an elongated tank having an upwardly inclined end portion extending above the principal side walls of said tank, a conveyor extending from the lower central portion of said tank upwardly along said inclined portion to discharge materials falling into the lower central portion of said tank, a deck spanning the side walls of said tank and sloping downwardly toward the end thereof opposite said first mentioned end portion, a fluid retaining wall depending downwardly from the lower end of said deck, a wall spanning the side walls of said tank and extending upwardly from the upper end of said deck, a plurality of transversely spaced open ended vertical flumes extending downwardly through said deck and adapted to retain upwardly flowing currents of hydraulic fluid, and means to deliver hydraulic fluid under pressure to the space below said deck to effect said upwardly flowing currents of fluid at velocities determined by the height of said wall extending upwardly from the upper end of said sloping deck.

5. Apparatus according to claim 4 further including an open topped fluid retaining compartment on the side of said downwardly extending wall opposite said space below said deck, and a dewatering shaker screen extending over the top of said compartment and adapted to receive the materials washed off said deck to dewater the same and discharge the same over the adjacent end of said tank.

6. Apparatus according to claim 4 further including an open topped fluid retaining compartment on the side of said depending wall opposite said space below said deck, a material dewatering and moving screen extending over the top of said compartment, said hydraulic fluid delivering means comprising a pump operative to transfer hydraulic fluid collected in the lower portion of said compartment to said space below said deck.

7. In hydraulic classifying apparatus a deck, a vertically directed flume extending up through said deck and adapted to contain an upward current of hydraulic fluid, said flume comprising end walls and parallel side walls spanning said end walls, the upper ends of said side walls being flared outwardly, a pair of spaced parallel diverters extending longitudinally above and parallel with the upper edges of said side walls, said diverters being operative to direct the material being supplied to said flume into the center portion of said current while the lighter materials in said current are carried out with the flow of hydraulic fluid intermediate said upper edges and said diverters, and means to drop said material into the top end of said flume in batches of controlled quantity and at controlled intervals of time.

WILLARD W. STRANAHAN.

REFERENCES CITED

The following references are of record in the file of this patent:

UNITED STATES PATENTS

| Number | Name | Date |
| --- | --- | --- |
| 1,420,163 | Trent | June 20, 1922 |
| 1,769,217 | Franz | July 1, 1930 |
| 1,585,720 | Jennings | May 25, 1926 |
| 303,889 | Sharp | Aug. 19, 1884 |
| 1,828,760 | Blatch | Oct. 27, 1931 |

FOREIGN PATENTS

| Number | Country | Date |
| --- | --- | --- |
| 173,501 | Great Britain | Nov. 9, 1922 |